United States Patent
Deng

(10) Patent No.: US 10,769,833 B2
(45) Date of Patent: Sep. 8, 2020

(54) METHOD AND APPARATUS FOR PROCESSING DISPLAY OF RESOURCE IN ANIMATION, AND TERMINAL

(71) Applicant: TENCENT TECHNOLOGY (SHENZHEN) COMPANY LIMITED, Shenzhen (CN)

(72) Inventor: Yang Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/356,579

(22) Filed: Mar. 18, 2019

(65) Prior Publication Data
US 2019/0213771 A1  Jul. 11, 2019

Related U.S. Application Data

(63) Continuation of application No. PCT/CN2017/115384, filed on Dec. 11, 2017.

(30) Foreign Application Priority Data

Dec. 30, 2016  (CN) .......................... 2016 1 1259328

(51) Int. Cl.
*G06T 13/20* (2011.01)
*G06T 15/20* (2011.01)
(Continued)

(52) U.S. Cl.
CPC .......... *G06T 13/20* (2013.01); *A63F 13/5258* (2014.09); *G06T 15/20* (2013.01);
(Continued)

(58) Field of Classification Search
CPC ......... G06T 13/20; G06T 15/20; G06T 13/00; G06T 2213/08; G06T 2207/30241;
(Continued)

(56) References Cited

U.S. PATENT DOCUMENTS

| | | | |
|---|---|---|---|
| 2015/0034722 A1* | 2/2015 | Roman | F41G 3/06 |
| | | | 235/404 |
| 2016/0069643 A1* | 3/2016 | Lyren | F41G 1/35 |
| | | | 345/589 |
| 2017/0368460 A1* | 12/2017 | Ceraldi | A63F 13/86 |

FOREIGN PATENT DOCUMENTS

| | | |
|---|---|---|
| CN | 1301583 | 7/2001 |
| CN | 103020989 | 4/2013 |
| CN | 103071288 | 5/2013 |
| CN | 104258566 | 1/2015 |

(Continued)

OTHER PUBLICATIONS

Zhaoyang Gan, Without distinction of friend and foe, only for the task-Sniper Elite V2, Light Weapons, Issue 12, Dec. 26, 2012, p. 48-50.
International Search Report dated Feb. 13, 2018 in PCT/CN2017/115384 filed Dec. 11, 2017. (With English Translation).
Written Opinion dated Feb. 13, 2018 in PCT/CN2017/115384 filed Dec. 11, 2017.

(Continued)

*Primary Examiner* — Xilin Guo
(74) *Attorney, Agent, or Firm* — Oblon, McClelland, Maier & Neustadt, L.L.P.

(57) ABSTRACT

A method, apparatus, and non-transitory computer-readable medium for display processing are provided. A projection trajectory of a projectile to a target is calculated. The projectile is moved to the target when the calculated projection trajectory satisfies a shooting condition. A current viewpoint is switched to a viewpoint from the projectile, and a first animation in which the projectile is tracked is played in slow motion. The viewpoint from the projectile is then switched to a viewpoint from the target at a preset time prior to when the projectile hits the target. A second animation is subsequently played in which the target is hit by the projectile.

20 Claims, 5 Drawing Sheets

(51) Int. Cl.
*A63F 13/5258* (2014.01)
*G06T 19/00* (2011.01)
*A63F 13/573* (2014.01)
*A63F 13/52* (2014.01)

(52) U.S. Cl.
CPC ............ *G06T 19/003* (2013.01); *A63F 13/52* (2014.09); *A63F 13/573* (2014.09); *A63F 2300/646* (2013.01); *G06T 2213/08* (2013.01)

(58) Field of Classification Search
CPC ........ G06T 7/20; A63F 13/52; A63F 13/5258; A63F 13/573; A63F 2300/646; A63F 13/12; A63B 24/0021; A63B 2024/0034
See application file for complete search history.

(56) References Cited

FOREIGN PATENT DOCUMENTS

| | | |
|---|---|---|
| CN | 104436657 | 3/2015 |
| CN | 104548599 | 4/2015 |
| CN | 105688409 | 6/2016 |
| CN | 106611436 | 5/2017 |

OTHER PUBLICATIONS

Combined Office Action and Search Report dated Jun. 22, 2018 in Chinese Patent Application No. 201611259328.0 (with Concise English translation).

Office Action dated Sep. 27, 2018 in Chinese Patent Application No. 201611259328.0 (with Concise English translation).

\* cited by examiner

METHOD AND APPARATUS FOR PROCESSING DISPLAY OF RESOURCE IN ANIMATION, AND TERMINAL

RELATED APPLICATION

This application is a continuation of International Application No. PCT/CN2017/115384, filed on Dec. 11, 2017, which claims priority to Chinese Patent Application No. 201611259328.0, filed on Dec. 30, 2016. The entire disclosures of the prior applications are hereby incorporated by reference in their entirety.

FIELD OF THE TECHNOLOGY

The present disclosure relates to display processing of resource in an animation.

BACKGROUND OF THE DISCLOSURE

In a current animation processing process, slow motion is usually used to reflect visual sensation for a photographed object, or clearly decompose an action change of the photographed object. Alternatively, photographing is first performed by using a high frame rate, then the frame rate per second is reduced, and post-production is performed to obtain a corresponding slow motion.

When the photographed object is in high-speed movement, in particular, under the circumstances that the photographed object switches quickly, the trajectory of the photographed object varies frequently, or the object moves frequently and in high speed, real-time slow motion processing is required for the high-speed action of the photographed object. However, current slow motion processing merely illustrates a simple slow motion effect, and there exists switching delays. Consequently, images having relatively strong visuals impacts cannot be captured.

SUMMARY

The present disclosure provides a method and an apparatus for display processing of resource in an animation, and a terminal, so that the problem in the related technology that a visual effect of slow action processing on an animation is relatively poor can be resolved.

According to a first aspect, an embodiment of the present disclosure provides a method for display processing in an animation. For example the method is performed by processing circuitry of an apparatus. In the method, a projection trajectory of a projectile to a target is calculated. The projectile is moved to the target when the calculated projection trajectory satisfies a shooting condition. A current viewpoint switches to a viewpoint from the projectile, and a first animation in which the projectile is tracked is played in slow motion. The viewpoint switches from the projectile to the target at a preset time prior to when the projectile hits the target. Further, a second animation in which the target is hit by the projectile is played in slow motion.

In some embodiments, the shooting condition includes at least one of: (i) the target is to be hit based on the projection trajectory, and (ii) the target is to be hit and knocked down based on the projection trajectory.

In some embodiments, the preset time is prior to a time that the projectile hits the target, and a time interval between the preset time and the time that the projectile hits the target exceeds a switching time interval. The switching time interval is a time duration of switching the viewpoint from the projectile to the target.

In some embodiments, when the current viewpoint is switched to the viewpoint from the projectile, the viewpoint from the projectile faces towards a virtual object that launches the projectile.

In some embodiments, a first time duration of the first animation starts from a time that the current viewpoint switches to the viewpoint from the projectile to a time that the viewpoint switches from the projectile to the target. Further a second time duration of the second animation starts from a time that the viewpoint switches from the projectile to the target to a time that the viewpoint switches from the target to the user.

In some embodiments, after the current viewpoint is switched to the viewpoint from the projectile, a flight parameter of the projectile is calculated in real time during the movement of the projectile, and a distance between the projectile and the target is calculated based on the obtained flight parameter. Further, the viewpoint switches from the projectile to the target at the preset time when the distance between the projectile and the target is within a preset distance range.

In some embodiments, the projection trajectory is calculated based on at least one of a speed of the projectile, a distance between the projectile and the target, an obstacle between the projectile and the target, and a kinetic energy loss.

According to a second aspect, an embodiment of the present disclosure provides an apparatus for display processing in an animation. The apparatus has a function corresponding to any method of display processing in an animation provided in the foregoing first aspect. The function can be implemented by using hardware or by using hardware implementing corresponding software. The hardware or software includes one or more units corresponding to the foregoing function, and the unit may be software and/or hardware.

In a possible design, the apparatus includes processing circuitry that is configured to calculate a projection trajectory of a projectile to a target. The processing circuitry is configured to move the projectile to the target when the calculated projection trajectory satisfies a shooting condition. The processing circuitry is configured to switch a current viewpoint to a viewpoint from the projectile and play, in slow motion, a first animation in which the projectile is tracked. Further, the processing circuitry is configured to switch the viewpoint from the projectile to the target at a preset time prior to when the projectile hits the target, and play, in slow motion, a second animation in which the projectile is hit by the projectile.

According to a third aspect, an embodiment of the present disclosure provides a non-transitory computer-readable medium storing instructions, the instructions, when run on a computer, causing the computer to perform the method according to any of the foregoing aspects.

According to a fourth aspect, an embodiment of the present disclosure provides a computer program product including instructions, the instructions, when run on a computer, causing the computer to perform the method according to any of the foregoing aspects.

According to a fifth aspect, an embodiment of the present disclosure further provides a terminal, including a processor and a memory, where the memory is configured to store an instruction; and the processor is configured to: execute the instruction in the memory, so that the terminal performs the method according to any of the foregoing aspects.

Compared with the related technology, an embodiment of the present disclosure first calculates the projection trajectory of the projectile to the target. After launching the projectile to the target, the present disclosure switches the current viewpoint to the projectile, plays, in slow motion, the first animation in which the projectile is tracked. Then, the present disclosure switches the viewpoint from the projectile to the target at a preset time prior to when the projectile hits the object, and plays, in slow motion, the second animation in which the target is hit by the projectile. In some embodiments of the present disclosure, each scenario during the movement of the projectile can be quickly tracked by constantly switching viewpoints, and the corresponding animation can be played in slow motion. Therefore, a user can obtain a good visual experience.

DESCRIPTION OF EMBODIMENTS

Figure 1:
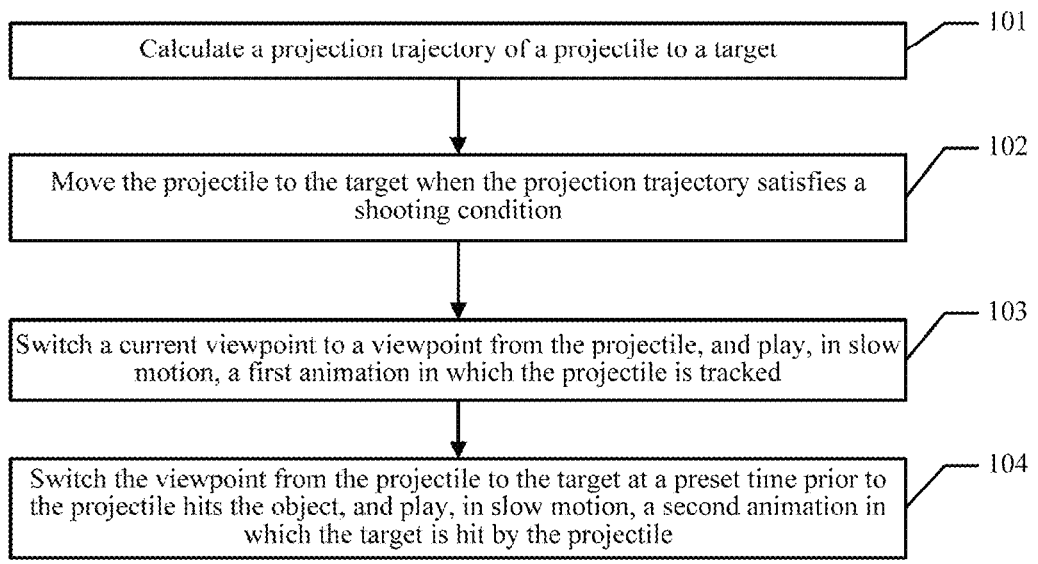
FIG. 1 is a schematic flowchart of a method for processing display of a resource in an animation according to an embodiment of the disclosure.

In the specification, claims, and the foregoing accompanying drawings of the present disclosure, the terms "first", "second", and so on are intended to distinguish between similar objects rather than indicating a specific order. It is understood that such used data can be exchanged with each other in appropriate cases, so that the embodiments described herein can be implemented in a sequence other than the sequences shown in the figures or content described herein. Moreover, the terms "include", "comprise", and any variants thereof are intended to cover a non-exclusive inclusion. For example, a process, method, system, product, or device that includes a list of steps or units is not necessarily limited to those steps or units that are clearly listed, but may optionally further include other steps or units not expressly listed or inherent to such a process, method, product, or device. The unit division in this specification is merely logical division and may be other division in actual implementation. For example, a plurality of units may be combined or integrated into another system, or some features may be ignored or not performed. In addition, the displayed or discussed mutual couplings or direct couplings or communications connections may be implemented through some interfaces. The indirect couplings or communications connections between the units may be implemented in electronic or other forms. This is not limited in this specification.

In addition, the units or subunits described as separate parts may or may not be physically separate, and the parts may or may not be physical units, or may be distributed in a plurality of circuit units. Some or all of the units may be selected according to actual needs to achieve the objectives of the solutions of the embodiments of the present disclosure.

Embodiments of the present disclosure provide a method and an apparatus for display processing in an animation and a terminal, and are applied to an image processing field, for example, may be used in a game scene, a movie scene, or the like, to improve a visual effect of slow action processing of an animation. Detailed descriptions are provided below.

The projectile in the present disclosure is an object launched (or otherwise projected or moved) by a virtual object to a target in an animation. The object may be specifically a virtual object in a virtual scene (such as a bullet or a sword in a game), or a physical object in a photographed scene. The object may also be a virtual object added in post processing of a video of the photographed scene, and the specific form is not limited in the present disclosure.

A slow motion is an effect in film-making whereby time appears to be slowed down, which is achieved when each film frame is captured at a rate much faster than it will be played back. When an animation is played back at a normal speed, a timeline walks very slowly, and a higher photographing frame rate indicates a lower photographing action, and a better animation effect. Therefore, a relatively high photographing frame rate can lead to a more vivid slow motion effect. When a user watches a normal playback animation, usually, 24 frames or 25 frames of images can be seen per second. For example, when a video having 60 frames per second (fps for short) is placed on the timeline, and is played back at 24 fps, one second of video needs to take 2.5 seconds for play, and the action becomes slow. If one second of this 24-fps video is played within 2.5 seconds, but without sufficient number of frames, because there is no sufficient data filling the gaps between frames, an action image jitters and becomes obscure.

A viewpoint from a projectile is a viewpoint in which animation photography is performed on the projectile when a lens is in front of the projectile, and a viewpoint from a target is a viewpoint in which animation photography is performed on the target when a lens is in front of the target. The viewpoint of the projectile and the viewpoint of the target may both be referred to as third-person viewpoints. By performing animation photography on a photographed object by using a third-person viewpoint, an animation having stronger visual impacts can be photographed. Based on different photographed objects, the projectile may be photographed by a lens of a camera by using a viewpoint from the projectile, or a target is photographed by using a viewpoint from the target. The lens of the camera may be switched the viewpoint from the projectile to the target in a manner of viewpoint switching.

To resolve the foregoing technical problem, the embodiments of the present disclosure provide the following technical solutions:

A projection trajectory of a projectile to a target is pre-calculated; after the projectile is launched, a current viewpoint switches to a viewpoint from the projectile based on the calculated projection trajectory, and a first animation in which the projectile is tracked is played in slow motion. Then, when the projectile is going to reach or reaches a distance range in which the target is to be hit, the viewpoint switches from the projectile to the target, and a second animation in which the projectile hits the target is played in slow motion.

By using the foregoing technical solutions, the embodiments of the present disclosure can effectively improve the visual impacts of the launching of the projectile and the hitting of the target by the projectile.

It is noted that the method in the present disclosure may be applied to a carried photographing apparatus (such as a digital camera or a single lens reflex). For example, it can be used to shoot a video, or can be applied to a game application program, photographing analog control software, or the like, and the specific application scenario is not limited in this specification.

In FIG. 1, a method for display processing in an animation provided in the present disclosure is described below by using an example. This method embodiment includes:

101: Calculate a projection trajectory of a projectile to a target.

When the projection trajectory is calculated, a projection flight parameter of the projectile may be first obtained, such as a speed of the projectile, a distance between the projectile and the target, an obstacle between the projectile and the target, and/or a kinetic energy loss. Then the projection trajectory can be calculated based on at least one of the speed of the projectile, the distance between the projectile and the target, the obstacle between the projectile and the target, and the kinetic energy loss.

The projection trajectory in the present disclosure is simulated by a curve which reflects the impacts of air resistance on energy attenuation, and the curve can predict a flight trajectory of the projectile after the projectile is launched. In this embodiment of the present disclosure, the projection trajectory can be pre-calculated, so that even a player cannot operate a virtual object of the projectile after the projectile is launched, the player can still accurately track the projectile by following the projection trajectory of the projectile, and obtain the location of each stop point at each stage based on the pre-calculated projection trajectory. Therefore, a predefined viewpoint can also be accurately switched timely based on the pre-calculated projection trajectory, so as to provide wonderful action play in the entire projection process to the player.

102: Move the projectile to the target when the projection trajectory satisfies a shooting condition.

The shooting condition may include at least one of: (i) the target is to be hit based on the projection trajectory, and (ii) the target is to be hit and knocked down based on the projection trajectory. By using a game scene as an example, the shooting condition may include at least one of: (i) a bullet is to hit a target based on bullet's projection trajectory, and (ii) the target is to be hit and knocked down by the bullet based on bullet's projection trajectory.

103: Switch a current viewpoint to a viewpoint from the projectile, and play, in slow motion, a first animation in which the projectile is tracked.

In this embodiment of the present disclosure, because the flight speed of the projectile is high, to facilitate the observation of the movement of the projectile for a user, the movement of the projectile is presented in an animation in slow motion, so that the user feels more vivid during watching, and strong visual impacts are brought to the user.

Figure 2:
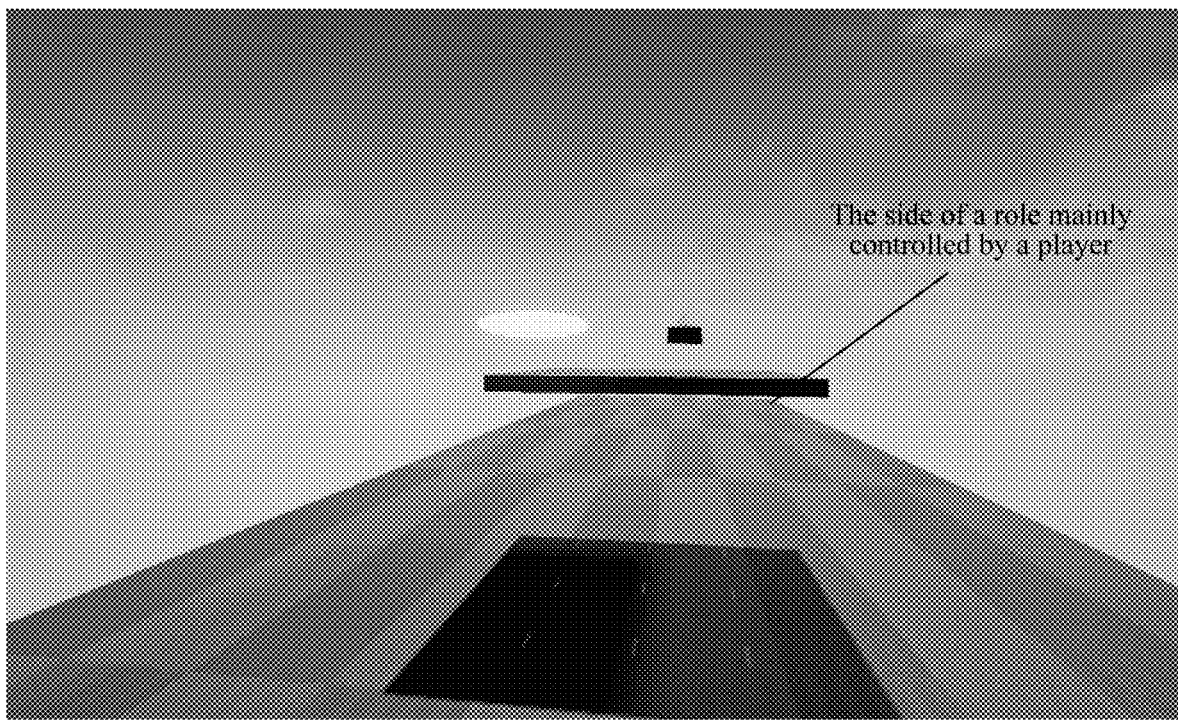
FIG. 2 is a schematic diagram of a viewpoint in which a projectile is tracked according to an embodiment of the disclosure.

FIG. 2 illustrates a schematic diagram of a viewpoint in which the projectile is tracked. In the viewpoint from the projectile, a first time duration of the first animation starts from a time that the current viewpoint switches to the viewpoint from the projectile to a time that the viewpoint switches from the projectile to the target. A second time duration of the second animation starts from a time that the viewpoint switches from the projectile to the target to a time that the viewpoint switches from the target to the user.

104: Switch the viewpoint from the projectile to a viewpoint from the target at a preset time prior to when the projectile hits the object, and play, in slow motion, a second animation in which the target is hit by the projectile.

The preset time is prior to a time that the projectile hits the target, and a time interval between the preset time and the time that the projectile hits the target exceeds a switching time interval, and the switching time interval is a time duration of switching the viewpoint from the projectile to the target.

Figure 3:
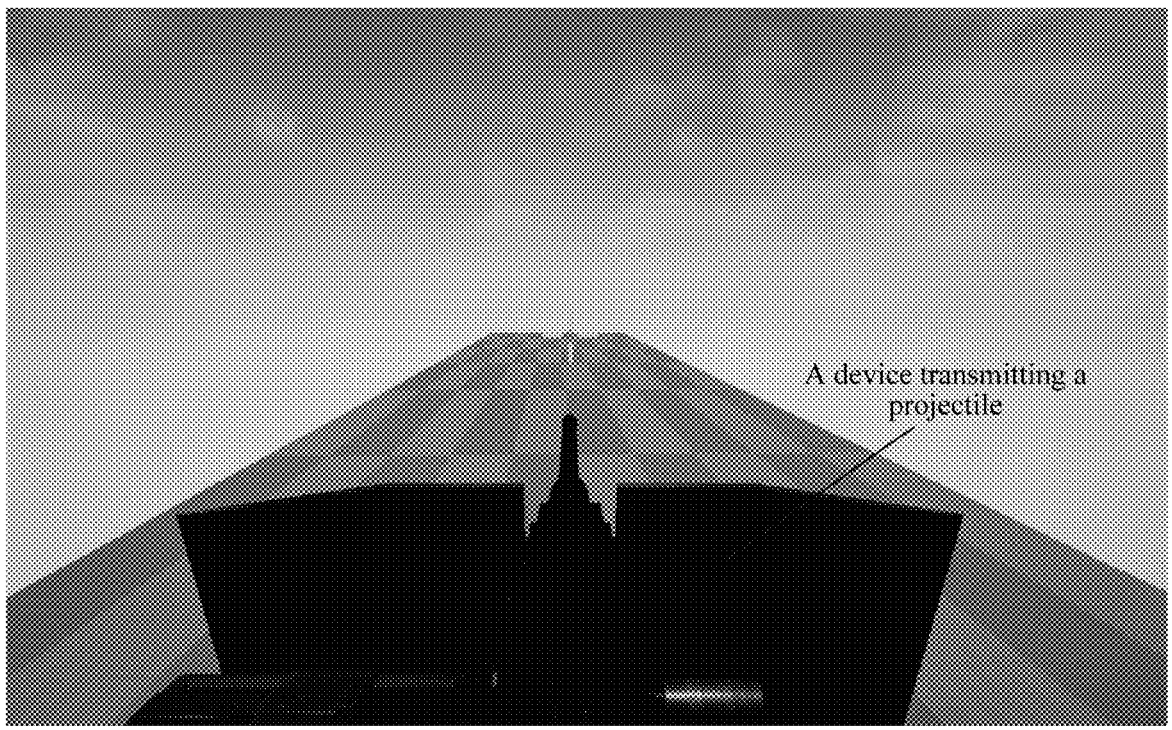
FIG. 3 is a schematic diagram of a viewpoint from a virtual object according to an embodiment of the disclosure.

In addition, in some embodiments of the present disclosure, after step 104, the viewpoint from the target can also switch to the viewpoint from the virtual object, so that a player re-obtains a control right for controlling the virtual object. A schematic diagram of the viewpoint from the virtual object is shown in FIG. 3.

Compared with the related technology, an embodiment of the present disclosure first calculates the projection trajectory of the projectile to the target. After the projectile is launched towards the target, the present disclosure switches the current viewpoint to the viewpoint from the projectile, and plays, in slow motion, the first animation in which the projectile is tracked. Then, the present disclosure switches the viewpoint from the projectile to the target at a preset time prior to when the projectile hits the object, and plays, in slow motion, the second animation in which the target is hit by the projectile. By constantly switching the viewpoints, each scenario in the movement of the projectile can be quickly tracked, and a corresponding animation can be played in slow motion. Therefore, a user can obtain a good visual experience.

Optionally, in some embodiments of the present disclosure, to reflect strong visual impacts to the user, when the current viewpoint is switched to the viewpoint from the projectile, the viewpoint from the projectile can face towards the virtual object that launches the projectile. For example, in a game scene, after a bullet is launched, the bullet is tracked in slow motion. The lens is located in front of the bullet and faces towards the player. In this way, a close-up of the player can be presented in a highlighted manner, and the player can obtain a better visual experience.

Optionally, in some embodiments of the present disclosure, during the movement of the projectile, regarding the originally calculated projection trajectory, a projectile flight parameter of the projectile may be slightly changed due to the factors such as an obstacle, resistance changes in air, or reduced capability of the projectile along the projection trajectory. For example, when a dynamic obstacle location along the projection trajectory changes and does not affect the projectile's flight, or air resistance becomes weaker, the actual flight time is less than the pre-estimated total flight time of the projection trajectory. Consequently, the projectile can hit the target earlier. In order to avoid the problem that an animation in which the target is hit is not played in time due to the delay caused by the switching from the projectile to the target based on the pre-estimated total flight time of the projection trajectory, in this embodiment of the present disclosure, a mechanism is further needed to be set: a remaining distance between the projectile and the target is pre-estimated, so as to control a time at which the viewpoint switches from the projectile to the target. Specifically, after the projectile is launched, a projectile flight parameter of the projectile during the movement of the projectile is calculated in real time, and then a distance between the projectile and the target is calculated based on the obtained flight parameter of the projectile. When the distance between the projectile and the target is within a preset distance range, the viewpoint switches from the projectile to the target at the preset time. For example, in a game scene, a virtual object A launches a bullet to a virtual object B; during the movement of the bullet, a distance between the bullet and the virtual object B needs to be calculated in real time; when the distance is within a range of 1 to 2 meters, preparation of the switching from the viewpoint from the bullet to the viewpoint from the virtual object B can be started, and the operation of switching the viewpoint from the bullet to the virtual object B needs to be completed within 0.1 second. In this way, it can ensure that the animation in which the bullet hits the virtual object B can be presented to the user.

Figure 4:
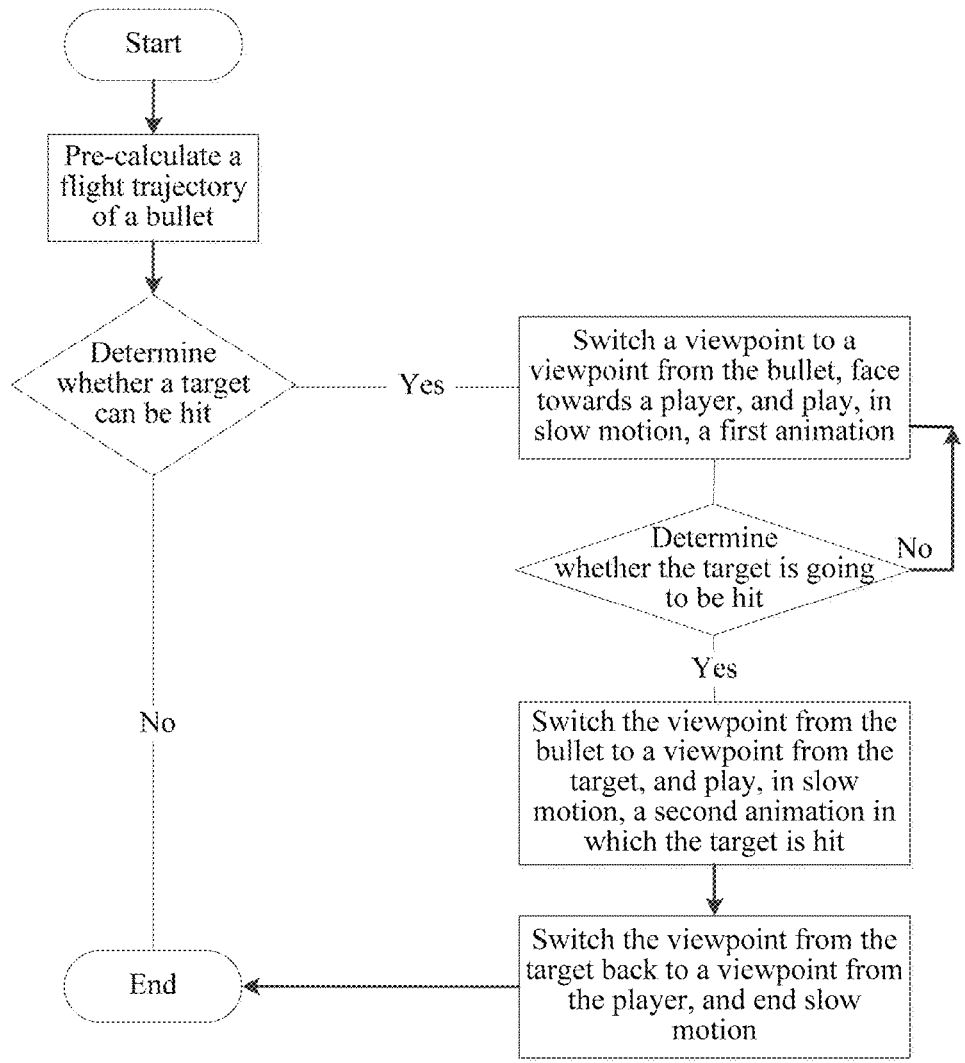
FIG. 4 is a schematic flowchart of tracking a viewpoint in a game scene according to an embodiment of the disclosure.
Figure 5:
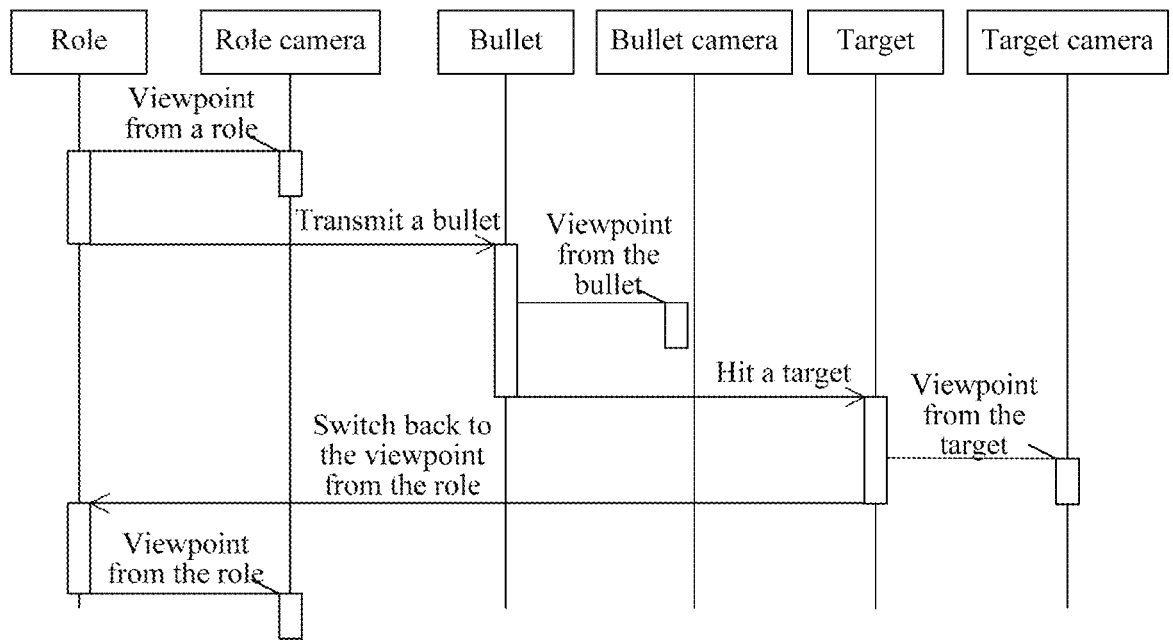
FIG. 5 is a flowchart of signaling of tracking a viewpoint in a game scene according to an embodiment of the disclosure.

For ease of understanding, this embodiment of the present disclosure is described below by using a specific application scenario as an example. A specific flowchart is show in FIG. 4, and a timing diagram is shown in FIG. 5. In FIG. 4, because a slow motion is used, and the viewpoint switches from the player to the bullet and to the target, respectively, the player will lose control over a role. To ensure the validity presented by the series in which the lens tracks the bullet, first, it is ensured through pre-calculation that the bullet necessarily hits the target after being launched and even the target die after being hit.

Before the bullet is launched, a pre-calculation is conducted to obtain a pre-calculated flight trajectory of the bullet based on a layout on a current application interface, an obstacle between a player and a target, flight parameters such as a flight speed and a kinetic energy, and other information. Then the pre-calculation is conducted based on the calculated flight trajectory to determine whether the bullet can hit the target or not, or whether the target can be knocked down or not. If the calculated flight trajectory ensures the projectile hits the target and even knocks down the target, the player can launch the bullet, and switch the viewpoint to the viewpoint from the bullet after the bullet is launched. Further, the player can track the bullet in flight in slow motion so that the player can observe the movement of the bullet and obtain a good visual experience.

Because the flight speed of the bullet is high, to display the flight attitude of the bullet and the wonderful details of bullet hitting the target to the player, lens tracking for the bullet may be reflected in slow motion. When tracking the bullet, the lens is located in front of the bullet and faces towards the player. In this way, a close-up of the player can be presented in a highlighted manner, and the player can watch flight of the bullet more conveniently, and stronger visual impacts are brought to the player.

In some embodiments of the present disclosure, in the entire game, one camera may be used in the entire process to track the game scene, or corresponding cameras may be respectively configured for a role mainly controlled by the player, the bullet, and the target, to facilitate quick switching between different lenses, thereby avoiding delay brought by lens switching. In addition, each photographed object invokes a separate camera, so that a close-up for the current photographed object can be highlighted.

As shown in FIG. 5, before the bullet is launched, a role camera is triggered. A photographing viewpoint from the role camera is a viewpoint from a role. After the role launches the bullet, a bullet camera is triggered and then the viewpoint switches from the role to the bullet. The bullet camera keeps tracking the movement of the bullet, and plays, in slow motion, a wonderful flight animation to the player. When the bullet is going to hit the target, a target camera is triggered, and then the viewpoint switches from the bullet to the target.

The target camera also films an animation in a current rage in slow motion. When the bullet hits the target, the target camera can film a close-up shot for the process that the bullet hits the target, and play back the recorded animation in slow motion, so that the user can obtain a wonderful visual experience.

After the target is hit by the bullet or even the target is knocked down or dies, the tracking of the bullet in slow motion can be ended. The role camera is triggered and the viewpoint switches from the target back to the role. Then the player regains the control for the role.

A method for processing display of a resource in an animation in the present disclosure is described above. An apparatus 600 used for display processing in an animation and performing the foregoing methods of display processing in an animation is described below.

Figure 6:
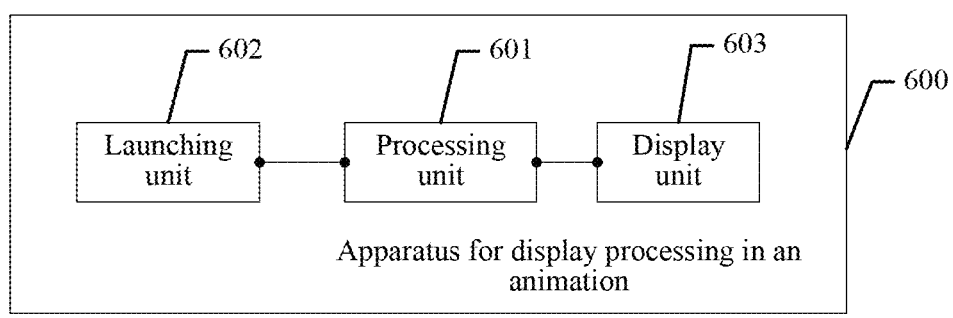
FIG. 6 is a schematic structural diagram of an apparatus for processing display of a resource in an animation according to an embodiment of the disclosure.

In FIG. 6, the apparatus 600 for display processing in an animation is described, and the apparatus 600 includes processing circuitry that includes, for example, a processing unit 601, a launching unit 602, and a display unit 603.

The processing unit 601 is configured to calculate a projection trajectory of a projectile to a target.

The transmit unit 602 moves the projectile to the target when the projection trajectory satisfies a shooting condition.

The display unit 603 switches a current viewpoint to a viewpoint from the projectile, and plays, in slow motion, a first animation in which the projectile is tracked.

The display unit 603 switches the viewpoint from the projectile to the target at a preset time prior to when the projectile hits the object, and plays, in slow motion, a second animation in which the target is hit by the projectile.

The shooting condition includes at least one of: (i) the target is to be hit based on the projection trajectory, and (ii) the target is to be hit and knocked down based on the projection trajectory.

The preset time is prior to a time that the projectile hits the target, and a time interval between the preset time and the time that the projectile hits the target exceeds a switching time interval, and the switching time interval is a time duration of switching from the viewpoint from the projectile to the viewpoint from the target.

Compared with the related technology, the processing unit 601 in the present disclosure first calculates the projection trajectory of the projectile to the target. After the launching unit 602 moves the projectile to the target, the display unit 603 switches the current viewpoint to the viewpoint from the projectile, and plays, in slow motion, the first animation in which the projectile is tracked. Then, the display unit 603 switches the viewpoint from the projectile to the target at the preset time prior to when the projectile hits the object, and plays, in slow motion, the second animation in which the target is hit by the projectile. By frequently switching the viewpoints, each scenario during the movement of the projectile can be quickly tracked, and a corresponding animation can be played in slow motion. Therefore, a user can obtain good visual experience.

Optionally, in some embodiments of the present disclosure, when the current viewpoint is switched to the viewpoint from the projectile, the viewpoint from the projectile faces towards a virtual object that launches the projectile.

Optionally, in some embodiments of the present disclosure, a first time duration of the first animation starts from a time that the current viewpoint switches to the viewpoint from the projectile to a time that the viewpoint switches from the projectile to the target; and a second time duration of the second animation starts from a time that the viewpoint switches from the projectile to the target to a time that the viewpoint switches from the target to the user.

Optionally, in some embodiments of the present disclosure, after the current viewpoint is switched to the viewpoint from the projectile, the processing unit 601 is further configured to calculate, in real time, a flight parameter of the projectile during the movement of the projectile, and calculate a distance between the projectile and the target based on the obtained flight parameter. The display unit 603 is further configured to switch the viewpoint from the projectile to the target, and switch the viewpoint from the projectile to the target at the preset time when the distance between the projectile and the target is within a preset distance range.

The display unit 603 is, for example, specifically configured to switch the viewpoint from the projectile to the target at the preset time when the distance between the projectile and the target is within a preset range.

Optionally, in some embodiments of the present disclosure, the processing unit 601 is specifically configured to calculate the projection trajectory based on at least one of a speed of the projectile, a distance between the projectile and the target, an obstacle between the projectile and the target, and a kinetic energy loss.

The apparatus in this embodiment of the present disclosure is described from a functional perspective of a utility entity. The apparatus in this embodiment of the present disclosure is further described from a hardware perspective.

Figure 7:
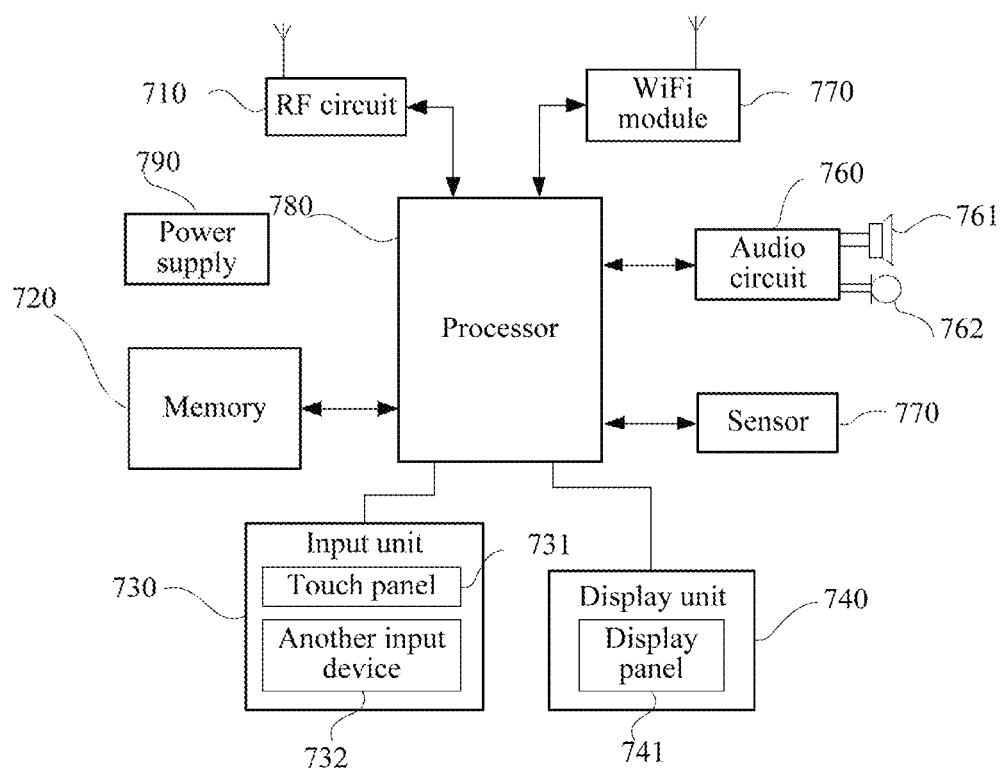
FIG. 7 is a schematic structural diagram of an apparatus for processing display of a resource in an animation according to an embodiment of the disclosure.

An embodiment of the present disclosure further provides a terminal device, which is a terminal device for processing display of a resource in an animation. As shown in FIG. 7, for ease of description, only parts related to this embodiment of the present disclosure are shown. For specific undisclosed technical details, please refer to the method part of the embodiments of the present disclosure. For example, the terminal device is a mobile terminal below:

FIG. 7 is a block diagram of part of structure of a mobile phone related to a mobile terminal according to an embodiment of the present disclosure. In FIG. 7, the mobile phone includes a radio frequency (RF for short) circuit 710, a memory 720, an input unit 730, a display unit 740, a sensor 770, an audio circuit 760, a Wi-Fi module 770, a processor 780, and a power supply 790. A person skilled in the art may understand that the structure of the mobile phone shown in FIG. 7 does not constitute a limitation to the mobile phone, and the mobile phone may include more components or fewer components than those shown in the figure, or some components may be combined, or a different component deployment may be used.

The following specifically describes the components of the mobile phone with reference to FIG. 7.

The RF circuit 710 may be configured to receive and send a signal during an information receiving and sending process or a call process. Specifically, the RF circuit receives downlink information from a base station, then delivers the downlink information to the processor 780 for processing, and sends related uplink data to the base station. Usually, the RF circuit 710 includes, but is not limited to, an antenna, at least one amplifier, a transceiver, a coupler, a low noise amplifier (LNA for short), and a duplexer. In addition, the RF circuit 710 may also communicate with a network and another device by wireless communication. The wireless communication may use any communication standard or protocol, which includes, but is not limited to, Global System for Mobile communications (GSM for short), General Packet Radio Service (GPRS), Code Division Multiple Access (CDMA for short), Wideband Code Division Multiple Access (WCDMA for short), Long Term Evolution (LTE for short), email, Short Messaging Service (SMS for short), and the like.

The memory 720 may be configured to store a software program and module. The processor 780 runs the software program and module stored in the memory 720, to implement various functional applications and data processing of the mobile phone. The memory 720 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 720 may include a high speed random access memory, and may further include a non-volatile memory, such as at least one magnetic disk storage device, a flash memory, or other volatile solid-state storage devices.

The input unit 730 may be configured to receive input digit or character information, and generate a keyboard input signal related to the user setting and function control of the mobile phone. Specifically, the input unit 730 may include a touch panel 731 and another input device 732. The touch panel 731 may also be referred to as a touchscreen, and may collect a touch operation of a user on or near the touch panel (such as an operation of a user on or near the touch panel 731 by using any suitable object or attachment, such as a finger or a touch pen), and drive a corresponding connection apparatus according to a preset program. Optionally, the touch panel 731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 780. Moreover, the touch controller can receive and execute a command sent from the processor 780. In addition, the touch panel 731 may be a resistive, capacitive, infrared, or surface sound wave type touch panel. In addition to the touch panel 731, the input unit 730 may further include another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various menus of the mobile phone. The display unit 740 may include a display panel 741. Optionally, the display panel 741 may be configured by using a liquid crystal display (LCD for short), an organic light-emitting diode (OLED for short), or the like. Further, the touch panel 731 may cover the display panel 741. After detecting a touch operation on or near the touch panel 731, the touch panel 731 transfers the touch operation to the processor 780, so as to determine a type of a touch event. Then, the processor 780 provides corresponding visual output on the display panel 741 according to the type of the touch event. Although, in FIG. 7, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone may further include at least one sensor 740 such as an optical sensor, a motion sensor, and other sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 760, a speaker 761, and a microphone 762 may provide audio interfaces between the user and the mobile phone. The audio circuit 760 may convert received audio data into an electric signal and transmit the electric signal to the speaker 761. The speaker 761 converts the electric signal into a sound signal for output. On the other hand, the microphone 762 converts a collected sound signal into an electric signal. The audio circuit 760 receives the electric signal and converts the electric signal into audio data, and sends the audio data to the processor 780 for processing. Then, the processor 780 sends the audio data to, for example, another mobile phone by using the RF circuit 710, or sends the audio data to the memory 720 for further processing.

Wi-Fi is a short distance wireless transmission technology. The mobile phone may use the Wi-Fi module 770 to receive and send emails, browse a web page, access streaming media, and so on, which provides wireless broadband Internet access for the user. Although FIG. 7 illustrates the Wi-Fi module 770, it may be understood that the Wi-Fi module 770 is not a necessary component of the mobile phone, and the Wi-Fi module 770 can be omitted without changing the essence of the present disclosure.

The processor 780 is the control center of the mobile phone, and is connected to various parts of the mobile phone by using various interfaces and lines. By running or executing the software program and/or unit or module stored in the memory 720, and invoking data stored in the memory 720, the processor 780 performs various functions and data processing of the mobile phone, thereby performing overall monitoring on the mobile phone. Optionally, the processor 780 may include one or more processing units. In an example, the processor 780 may integrate an application processor and a modem processor. The application processor mainly processes an operating system, a user interface, an application program, and the like. The modem processor mainly processes wireless communication. It may be understood that the foregoing modem may not be integrated into the processor 780.

The mobile phone further includes the power supply 790 (such as a battery) for supplying power to the components. In an example, the power supply may be logically connected to the processor 780 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the present disclosure, the processor 780 in the mobile phone can further control the method executed by the terminal device that displays the animation.

In the aforementioned embodiments, each description of the embodiments has respective emphasis. For a certain part that is not described in detail in an embodiment, please refer to related descriptions in other embodiments.

It can be clearly learned by a person skilled in the art that, for the purpose of convenience and brief description, the specific working process of the foregoing system, apparatus, module, and unit, can be referred to a corresponding process in the foregoing method embodiments, and details are not described herein again.

In some of the embodiments provided in this application, it is understood that the disclosed system, apparatus, and method may be implemented in other manners. For example, the described apparatus embodiments are exemplary. In some examples, the unit division is a logical function division and can be other division in actual implementation. In some other examples, a plurality of units or components may be combined or integrated into another system, or some features may be ignored or not performed. In addition, the mutual couplings, direct coupling or communication connections that are displayed or discussed in the disclosure can be implemented in electronic, mechanical, or other forms.

The units that are described as separate parts can be physically separate or not, and the parts that are displayed as units can be physical units or not. They may be located together in one position, or may be distributed on a plurality of network units. Some of or all of the units may be selected to achieve the objectives of the solutions of the embodiments based on actual needs.

In addition, functional units in the embodiments of the present disclosure may be integrated into one processing unit, or each of the units may physically exist independently, or two or more units may be integrated into one unit. The integrated unit may be implemented in the form of hardware (e.g., processing circuitry), or may be implemented in the form of a software functional unit.

If the integrated unit is implemented in the form of a software functional module and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM for short), a random access memory (RAM for short), a magnetic disk, or an optical disc.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

The technical solutions provided in the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person of ordinary skill in the art may make modifications to the specific implementations and application range according to the idea of the present disclosure. In conclusion, the content of this specification should not be construed as a limit on the present disclosure.

What is claimed is:

1. A method for display processing, comprising:
   receiving a request to a launch a projectile;
   before launching the projectile,
      calculating, by processing circuitry of an apparatus, a projection trajectory of a projectile to a target,
      determining, by the processing circuitry, whether the projection trajectory of the projectile reaches the target; and
   based on the projection trajectory of the projectile being determined to reach the target,
      moving, by the processing circuitry, the projectile to the target,
      switching, by the processing circuitry, a current viewpoint to a viewpoint from the projectile, and playing, in slow motion, a first animation in which the projectile is tracked, and
      switching, by the processing circuitry, the viewpoint from the projectile to a viewpoint from the target at a preset time prior to when the projectile hits the target, and playing, in slow motion, a second animation in which the target is hit by the projectile.

2. The method according to claim 1, wherein the moving comprises moving the projectile to the target based on at least one of: (i) the target is to be hit based on the projection trajectory, and (ii) the target is to be hit and knocked down based on the projection trajectory.

3. The method according to claim 1, wherein
   the preset time is prior to a time that the projectile hits the target, and a time interval between the preset time and the time that the projectile hits the target exceeds a switching time interval, and
   the switching time interval is a time duration of switching from the viewpoint from the projectile to the viewpoint from the target.

4. The method according to claim 1, wherein when the current viewpoint is switched to the viewpoint from the projectile, the viewpoint from the projectile faces towards a virtual object that launches the projectile.

5. The method according to claim 1, wherein
   a first time duration of the first animation starts from a time that the current viewpoint switches to the viewpoint from the projectile to a time that the viewpoint from the projectile switches to the viewpoint from the target; and
   a second time duration of the second animation starts from the time that the viewpoint from the projectile switches to the viewpoint from the target to a time that the viewpoint from the target switches to the viewpoint from a user.

6. The method according to claim 1, further comprises:
   after the current viewpoint is switched to the viewpoint from the projectile, calculating, in real time, a flight parameter of the projectile during movement of the projectile, and calculating a distance between the projectile and the target based on the obtained flight parameter, wherein
   the switching the viewpoint from the projectile to the viewpoint from the target includes switching the viewpoint from the projectile to the viewpoint from the target at the preset time when the distance between the projectile and the target is within a preset distance range.

7. The method according to claim 1, wherein the calculating the projection trajectory comprises:
   calculating the projection trajectory based on at least one of a speed of the projectile, a distance between the projectile and the target, an obstacle between the projectile and the target, and a kinetic energy loss.

8. An apparatus, comprising:
   processing circuitry configured to
      receive a request to launch a projectile;
      before the projectile is launched,
         calculate a projection trajectory of a projectile to a target,
         determine whether the projection trajectory of the projectile reaches the target; and
      based on the projection trajectory of the projectile being determined to reach the target,
         move the projectile to the target,
         switch a current view point to a viewpoint from the projectile and play, in slow motion, a first animation in which the projectile is tracked, and
         switch the viewpoint from the projectile to a viewpoint from the target at a preset time prior to when the projectile hits the target, and play, in slow motion, a second animation in which the projectile is hit by the projectile.

9. The apparatus according to claim 8, wherein the processing circuitry is configured to move the projectile to the target based on at least one of: (i) the target is to be hit based on the projection trajectory, and (ii) the target is to be hit and knocked down based on the projection trajectory.

10. The apparatus according to claim 8, wherein
    the preset time is prior to a time that the projectile hits the target, and a time interval between the preset time and the time that the projectile hits the target exceeds a switching time interval, and
    the switching time interval is a time duration of switching from the viewpoint from the projectile to the viewpoint from the target.

11. The apparatus according to claim 8, wherein when the current viewpoint is switched to the viewpoint from the projectile, the viewpoint from the projectile faces towards a virtual object that launches the projectile.

12. The apparatus according to claim 8, wherein
    a first time duration of the first animation starts from a time that the current viewpoint switches to the viewpoint from the projectile to a time that the viewpoint from the projectile switches to the viewpoint from the target; and
    a second time duration of the second animation that starts from the time that the viewpoint from the projectile switches to the viewpoint from the target to a time that the viewpoint from the target switches to the viewpoint from a user.

13. The apparatus according to claim 8, wherein the processing circuitry is further configured to:
    after the current viewpoint is switched to the viewpoint from the projectile, calculate, in real time, a flight parameter of the projectile during movement of the projectile, and calculate a distance between the projectile and the target based on the obtained flight parameter; and
    switch the viewpoint from the projectile to the viewpoint from the target at the preset time when the distance between the projectile and the target is within a preset distance range.

14. The apparatus according to claim 8, wherein the processing circuitry is configured to:
    calculate the projection trajectory based on at least one of a speed of the projectile, a distance between the projectile and the target, an obstacle between the projectile and the target, and a kinetic energy loss.

15. A non-transitory computer-readable medium storing instructions which when executed by a computer cause the computer to perform:
    receiving a request to a launch a projectile;
    before launching the projectile,
        calculating a projection trajectory of a projectile to a target,
        determining whether the projection trajectory of the projectile reaches the target; and
    based on the projection trajectory of the projectile being determined to reach the target,
        moving the projectile to the target,
        switching a current viewpoint to a viewpoint from the projectile, and playing, in slow motion, a first animation in which the projectile is tracked, and
        switching the viewpoint from the projectile to a viewpoint from the target at a preset time prior to when the projectile hits the target, and playing, in slow motion, a second animation in which the target is hit by the projectile.

16. The non-transitory computer-readable medium according to claim 15, wherein the moving comprises moving the projectile to the target based on at least one of: (i) the target is to be hit based on the projection trajectory, and (ii) the target is to be hit and knocked down based on the projection trajectory.

17. The non-transitory computer-readable medium according to claim 15, wherein
    the preset time is prior to a time that the projectile hits the target, and a time interval between the preset time and the time that the projectile hits the target exceeds a switching time interval, and
    the switching time interval is a time duration of switching from the viewpoint from the projectile to the viewpoint from the target.

18. The non-transitory computer-readable medium according to claim 15, wherein
    a first time duration of the first animation starts from a time that the current viewpoint switches to the viewpoint from the projectile to a time that the viewpoint from the projectile switches to the viewpoint from the target; and
    a second time duration of the second animation starts from the time that the viewpoint from the projectile switches to the viewpoint from the target to a time that the viewpoint from the target switches to the viewpoint from a user.

19. The non-transitory computer-readable medium according to claim 15, wherein the instructions when executed by the computer further cause the computer to perform:
    after the current viewpoint is switched to the viewpoint from the projectile, calculating, in real time, a flight parameter of the projectile during movement of the projectile, and calculating a distance between the projectile and the target based on the obtained flight parameter; and
    the switching the viewpoint from the projectile to the viewpoint from the target includes switching the viewpoint from the projectile to the viewpoint from the target at the preset time when the distance between the projectile and the target is within a preset distance range.

20. The non-transitory computer-readable medium according to claim 15, wherein the calculating the projection trajectory comprises:
    calculating the projection trajectory based on at least one of a speed of the projectile, a distance between the projectile and the target, an obstacle between the projectile and the target, and a kinetic energy loss.

* * * * *